United States Patent
Zami

(10) Patent No.: US 7,177,542 B2
(45) Date of Patent: Feb. 13, 2007

(54) GENERATOR OF OPTICAL DATA CARRIER SIGNALS WITH SELECTABLE CARRIER WAVELENGTHS

(75) Inventor: Thierry Zami, Massy (FR)

(73) Assignee: Alcatel, Paris (FR)

( * ) Notice: Subject to any disclaimer, the term of this patent is extended or adjusted under 35 U.S.C. 154(b) by 625 days.

(21) Appl. No.: 10/410,439

(22) Filed: Apr. 10, 2003

(65) Prior Publication Data

US 2003/0194235 A1 Oct. 16, 2003

(30) Foreign Application Priority Data

Apr. 11, 2002 (FR) .................................. 02 04526

(51) Int. Cl.
*H04J 14/00* (2006.01)

(52) U.S. Cl. ............................. 398/45; 398/48; 398/49; 398/50; 398/56

(58) Field of Classification Search .................. 398/45, 398/49, 50, 56, 48; 385/16
See application file for complete search history.

(56) References Cited

U.S. PATENT DOCUMENTS 6,771,906 B1 * 8/2004 Bouette et al. ............... 398/50

| 7,010,230 | B2 * | 3/2006 | Lee et al. | 398/102 |
|---|---|---|---|---|
| 7,013,086 | B2 * | 3/2006 | Bischoff | 398/89 |
| 2001/0030787 | A1 * | 10/2001 | Tajima | 359/128 |
| 2002/0044319 | A1 * | 4/2002 | Kashima | 359/128 |
| 2002/0181062 | A1 * | 12/2002 | Graves et al. | 359/180 |

FOREIGN PATENT DOCUMENTS

| EP | 1 179 964 A2 | 2/2002 |
|---|---|---|
| WO | WO 01/71959 A2 | 9/2001 |

* cited by examiner

*Primary Examiner*—M. R. Sedighian
(74) *Attorney, Agent, or Firm*—Sughrue Mion, PLLC

(57) ABSTRACT

The present invention concerns a generator (G1) for generating at least M data carrier optical signals with selectable carrier wavelengths, where M is an integer greater than 1, said generator comprising N laser sources ($S_i$) with constant and different wavelengths, where N is an integer greater than 1, and an optoelectronic modulator ($Mod_1$) adapted to form one of said M optical data carrier signals, which generator is characterized in that it includes:

M−1 other optoelectronic modulators ($Mod_2$ to $Mod_M$) each adapted to form one of said M−1 other optical data carrier signals, and an at least partially broadcasting optical switch (100) having N input ports ($PE_i$) connected to the N laser sources and M output ports ($PS_i$) connected to the M modulators, the optical switch being adapted to send to a plurality of modulators an output signal with a selectable carrier wavelength, to form said M signals.

10 Claims, 5 Drawing Sheets

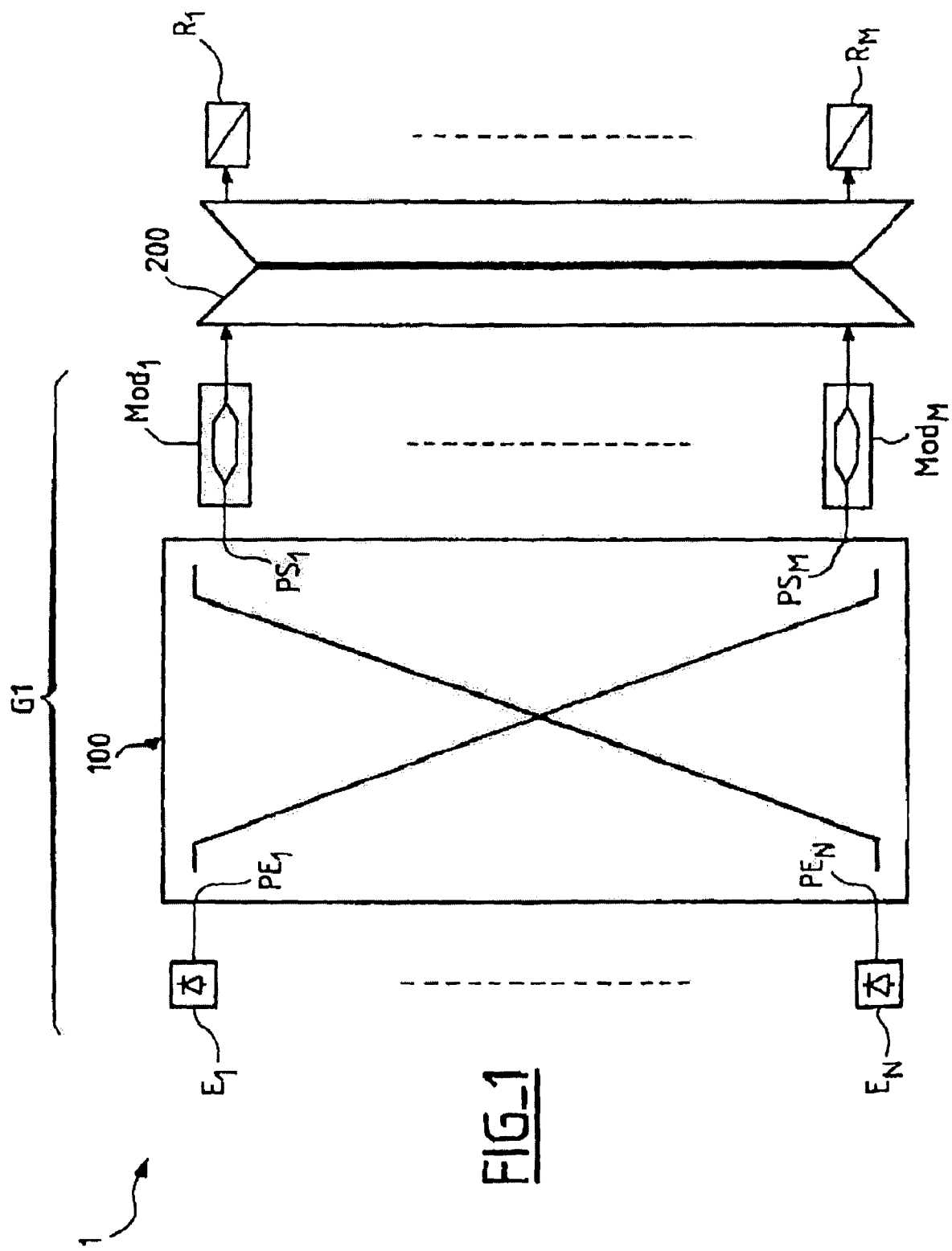
FIG_1

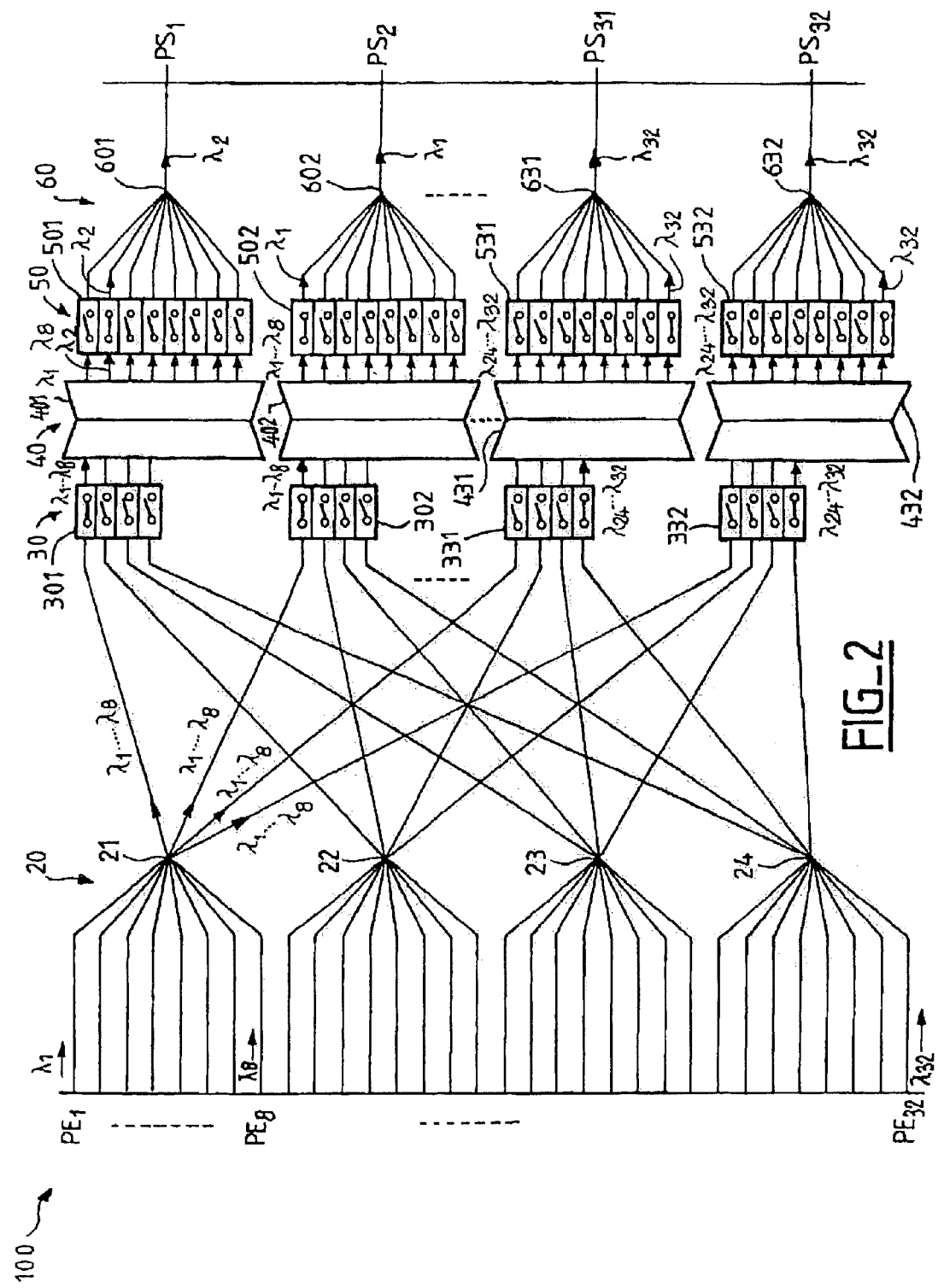
FIG_2

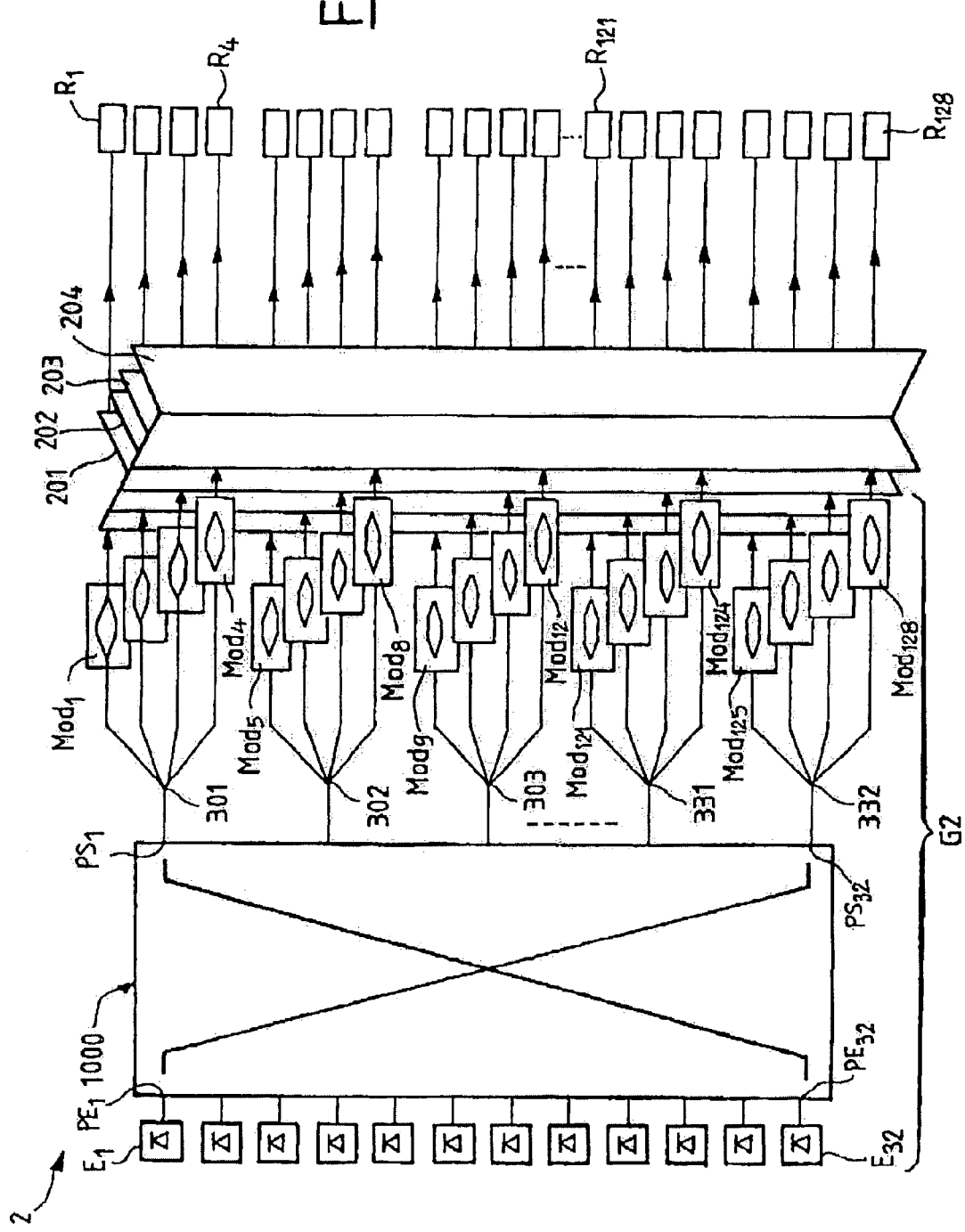
FIG_3

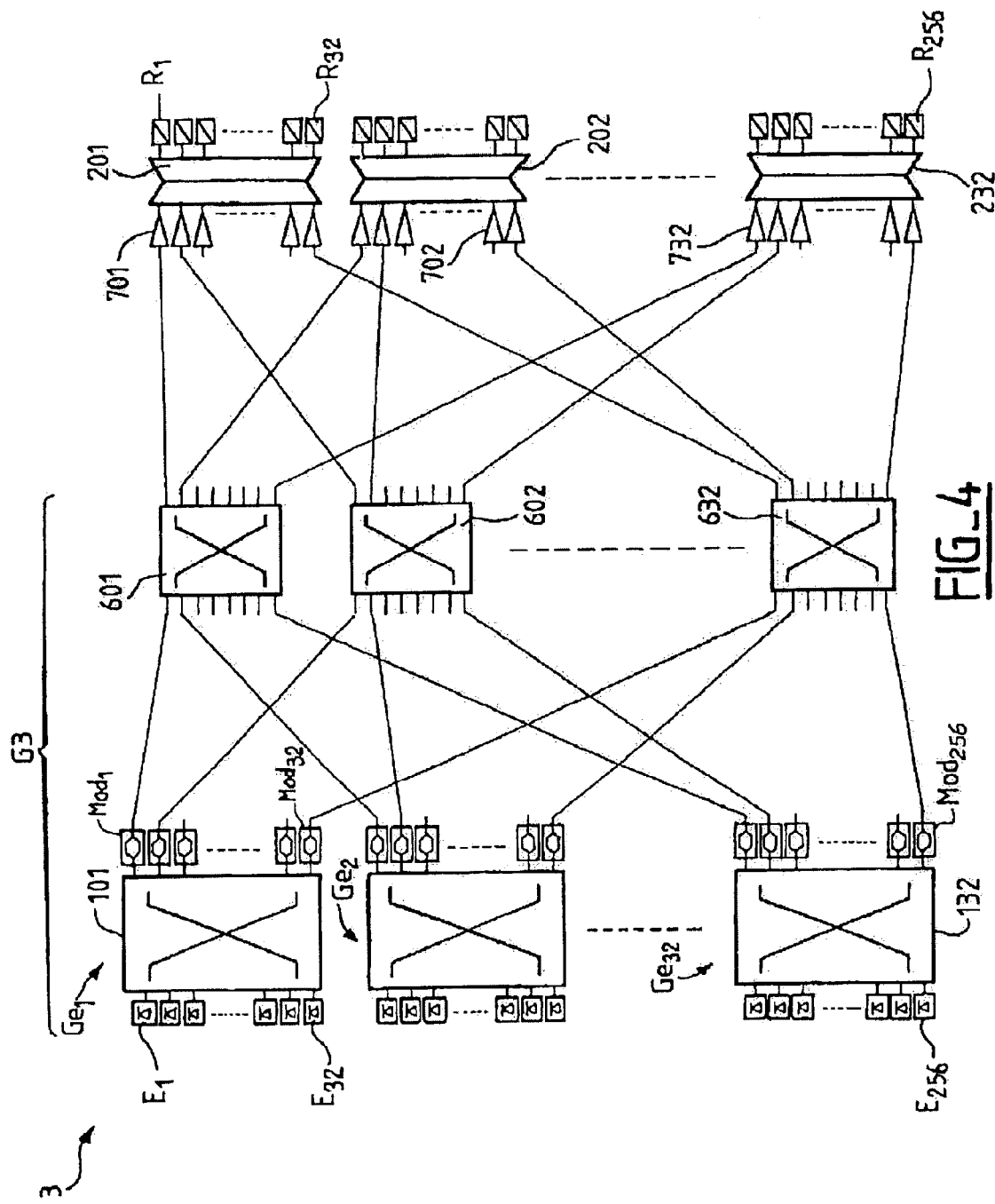
FIG_4

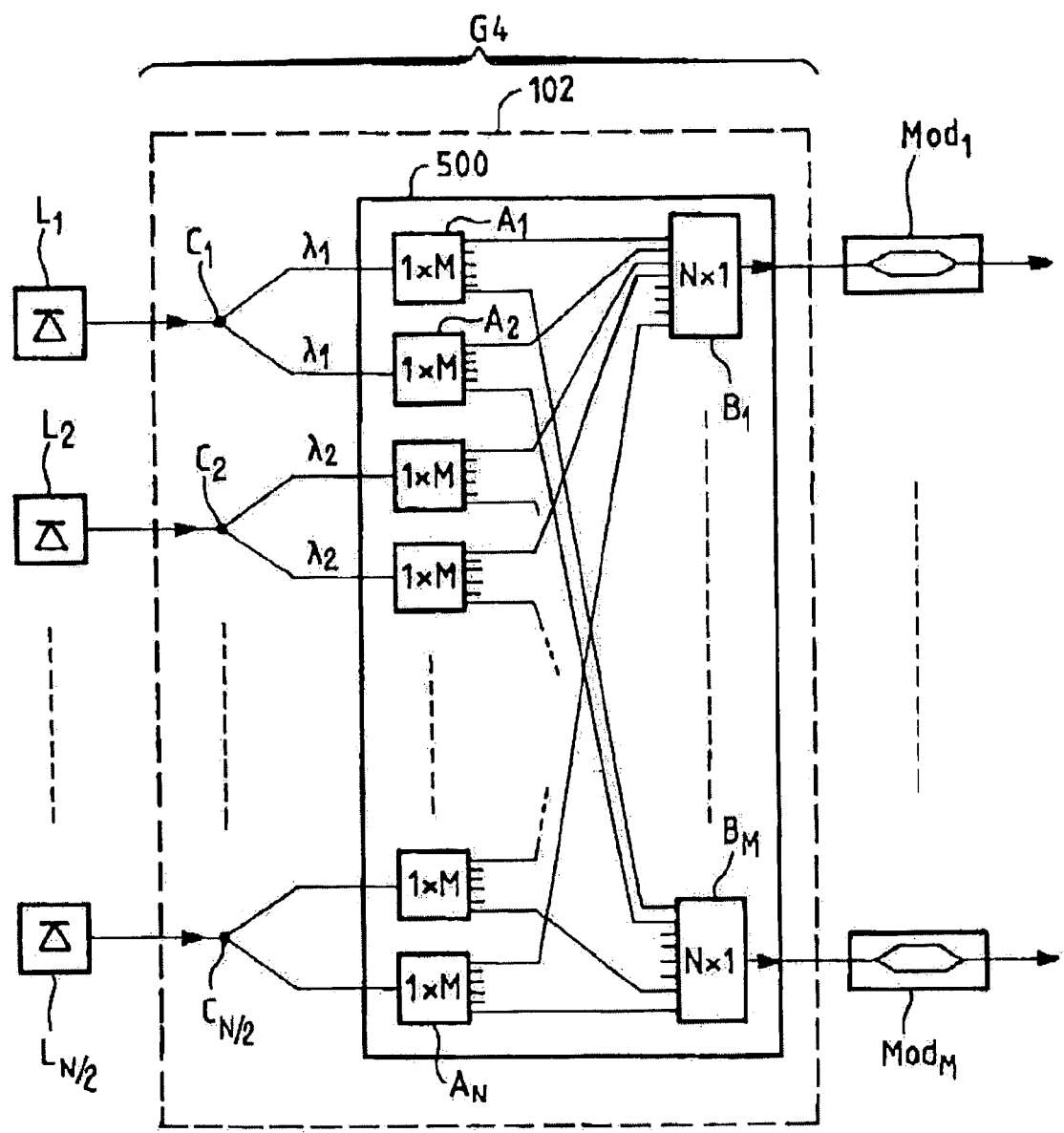
FIG_5

GENERATOR OF OPTICAL DATA CARRIER SIGNALS WITH SELECTABLE CARRIER WAVELENGTHS

The present invention relates to optical transmission of data, and to be more precise it relates to a generator of optical data carrier signals with selectable carrier wavelengths.

BACKGROUND OF THE INVENTION

Attempts are being made to increase the capacity of optical data transmission systems, which usually employ amplitude modulation of an optical carrier wave. There are many research projects at the present time seeking to develop simultaneous transmission of data addressed to the largest possible number of users.

Routing data by means of wavelength division multiplexers has the advantage of being passive. However, to obtain the full benefit of this advantage, it is advisable to modify the carrier wavelengths assigned to each addressee as soon as needed. The time to switch from one wavelength to another is referred to as the tuning time and must be as short as possible.

A solution providing a generator of optical data carrier signals with selectable carrier wavelengths described in the paper "RINGO: a WDM ring optical packet network demonstrator", R. Gaudino et al., Th.L.2.6, ECOC'2001, September 2001, uses as many constant wavelength laser sources as there are wavelengths that can be used, the sources feeding an optical multiplexer. Thus a signal at a chosen wavelength is injected into an optoelectronic modulator which forms a data carrier signal to be sent to an associated addressee.

Because the number of laser sources is proportional to the number of addressees, a device of the above kind is costly, consumes too much power, and is difficult to integrate into existing optical transmission systems such as optical routing systems and communication nodes of metropolitan area networks, which nodes are getting progressively smaller.

OBJECTS AND SUMMARY OF THE INVENTION

The present invention aims to provide a generator of optical data carrier signals with selectable carrier wavelengths. The architecture of this kind of generator must allow it to be integrated into an optical transmission system at competitive cost and to have a short tuning time.

To this end, the present invention proposes a generator for generating at least M data carrier optical signals having selectable carrier wavelengths, where M is an integer greater than 1, said generator comprising N laser sources with constant and different wavelengths, where N is an integer greater than 1, and an optoelectronic modulator adapted to form one of said M optical data carrier signals:

which generator is characterized in that it comprises:
  M−1 other optoelectronic modulators each adapted to form one of said M−1 other optical data carrier signals, and
  an at least partially broadcasting optical switch having N input ports coupled to the N laser sources and having M output ports coupled to the M modulators, the optical switch being adapted to send to a plurality of modulators the same signal selected from the signals supplied by the laser sources, to form a plurality of signals.

An at least partially broadcasting optical switch of the invention can connect any input port to a plurality of output ports. Thus using an at least partially broadcasting optical switch of the invention means that the laser sources can be shared between a plurality of addressees. The generator of the invention is relatively inexpensive, compared to the prior art solution described above, because of the small number of laser sources necessary for tuning, and it is of compact size, which facilitates integrating the generator.

Moreover, using constant wavelength sources facilitates controlling the value of each carrier wavelength.

The generator of the invention has good scalability: increasing the number of wavelengths to be used and/or the number of addressees does not lead to major modifications of the generator architecture.

In the generator of the invention, the tuning time is determined by the switching time.

A fast at least partially broadcasting switch advantageously has a tuning time of less than 30 nanoseconds (ns) and preferably of the order of 10 ns.

A fast switch of the invention can, for example, be based on optical gates implemented using the semiconductor optical amplifier (SOA) technology. Placing the optical switch of the invention upstream of the modulators, rather than downstream, avoids the known problems of unwanted cross modulation between modulated signals passing through the same SOA at the same time. These problems are known as cross gain modulation (XGM) and four wave mixing (FWM).

The at least partially broadcasting switch preferably includes a broadcasting stage for broadcasting M×K groups of signals each comprising N/K signals with different wavelengths, the broadcasting stage including K, where K is an integer factor of N, optical signal coupling means each having M outputs and N/K inputs connected to a separate set of N/K input ports, each of the coupling means being adapted to send a group to each output port.

A preferred embodiment of the at least partially broadcasting optical switch further includes:
  a first selector stage adapted to select M of the M×K broadcast groups,
  a separator stage adapted to separate the N/K signals of each of the M selected groups, and
  a second selector stage adapted to receive the separated signals and to select said M output signals.

The first selector stage can preferably include M sets of K optical gates, one optical gate from each set being open, i.e. allowing a signal packet to pass, while the generator is operating.

Furthermore, the second selector stage can include M sets of N/K optical gates, one optical gate from each set being open when the generator is operating.

The optical gates, which are of the SOA type, for example, can also amplify signals not yet modulated. Thus each SOA can be saturated, to reduce power fluctuations between signals. This enables data transmission with an improved optical signal to noise ratio and facilitates detection of signals by receivers.

The separator stage can include M cyclic wavelength division demultiplexers using arrayed waveguide gratings (AWG).

An AWG wavelength division demultiplexer is an integrated optical circuit comprising a plurality of curved parallel waveguides in which the path length difference enables signals with different carrier wavelengths to be separated at any given time.

An AWG has a plurality of inputs and a plurality of outputs, for example five inputs and five outputs. For a given input, it behaves as a simple wavelength division demultiplexer.

If a group of signals with five wavelengths is shifted, for example by one input, for instance injected at input No. 2 instead of input No. 1, the five demultiplexed wavelengths associated with each of the five outputs are shifted by as many outputs. Following this shift, because the number of outputs is limited, the wavelengths initially associated with output No. 5 of the AWG can no longer be associated with an output. There is a cyclic AWG configuration in which that wavelength is then associated with output No. 1.

An advantageous embodiment of a generator of the invention can produce M×P optical data carrier signals with selectable carrier wavelengths, where P is an integer greater than 1. In this context, the generator includes (P−1)×M other optoelectronic modulators connected in sets of P modulators to a separate output port of the optical switch.

Another advantageous embodiment of a generator of the invention can produce C×M optical data carrier signals with selectable carrier wavelengths, where C is an integer greater than 1. In this context, the generator includes C generators of M signals and M optical switches each having C inputs and C outputs and each connected to a separate modulator of each generator.

These latter two configurations increase the data transmission capacity, which is equal to the product of the granularity and the connectivity. In the first configuration, the granularity, i.e. the quantity of data transmitted to each addressee, is increased by increasing the number of modulators. In the second configuration, the connectivity, i.e. the number of addressees, and thus the number of data carrier signals, is increased.

Each modulator is preferably chosen from the group comprising lithium niobate Mach-Zehnder modulators, electro-absorption modulators, and all-optical converters.

A particular embodiment is characterized in that the at least partially broadcasting switch includes a broadcasting stage for broadcasting to a plurality of destinations each signal provided by the laser sources, independently of the other signals, followed by a selection stage including a non-broadcast space-division switch.

The invention also relates to a data transmission system incorporating a generator of the invention as defined above.

For example, for a system incorporating a generator of 32 signals and including 32 modulators with a modulation rate of 10 gigabits per second (Gbit/s), the transmission capacity is 320 Gbit/s.

A system of the invention preferably includes an AWG wavelength division demultiplexer, for example a cyclic demultiplexer, adapted to separate the signals from said generator in order to send them to respective addressees.

BRIEF DESCRIPTION OF THE DRAWINGS

Other features and advantages of the present invention will become apparent in the course of the following description of one embodiment of the invention, which is given by way of illustrative and non-limiting example.

In the accompanying drawings:

FIG. 1 shows diagrammatically the architecture of a data transmission system including a first embodiment of a data carrier signal generator of the invention;

FIG. 2 shows the architecture of a switch of the FIG. 1 generator in greater detail, FIG. 3 shows diagrammatically the architecture of a data transmission system including a second embodiment of a data carrier signal generator of the invention;

FIG. 4 shows diagrammatically the architecture of a data transmission system including a third embodiment of a data carrier signal generator of the invention; and FIG. 5 shows diagrammatically the architecture of a fourth embodiment of a data carrier signal generator of the invention.

MORE DETAILED DESCRIPTION

Items common to more than one figure are identified by the same reference number in all figures in which they appear.

FIG. 1 shows diagrammatically the architecture of a data transmission system 1 including a first embodiment of a generator G1 of the invention of data carrier signals with selectable wavelengths.

The generator G1 supplies M optical signals, where M>1, to an AWG cyclic wavelength division demultiplexer 200 having M inputs and M outputs in order to separate the M injected signals and direct them to the receivers $(R_j)_{1 \leq j \leq M}$ to which the data is addressed.

The generator G1 includes laser sources numbered 1 to N $(E_i)_{1 \leq i \leq N}$ of increasing constant wavelengths $\lambda_{i1 \leq i \leq N}$. The corresponding carrier frequencies $(f_i)_{1 \leq i \leq N}$ are decreasing and regularly distributed over a frequency comb, for example at equal steps of 100 GHz. The generator G1 includes an at least partially broadcasting optical switch 100, of which each input port $(PE_i)_{1 \leq i \leq N}$ is connected to the laser source $(E_i)_{1 \leq i \leq N}$ with the same number and each output port $(PS_i)_{1 \leq i \leq M}$ of which is connected to an optoelectronic modulator $(Mod_i)_{1 \leq i \leq M}$ with the same number, for example a 10 Gbit/s lithium niobate Mach-Zehnder modulator.

The transmission capacity of the system 1 is 10×M Gbit/s.

To reduce the number of carrier wavelengths needed, the AWG wavelength division demultiplexer 200 is cyclic. It therefore uses the correspondence table below, which indicates for each modulator, the carrier wavelength to use at any given time, as a function of the addressee receiver. To simplify the description, the situation where M=N=4 has been chosen.

TABLE 1

|  | $Mod_1$ | $Mod_2$ | $Mod_3$ | $Mod_4$ |
| --- | --- | --- | --- | --- |
| $R_1$ | $\lambda_1$ | $\lambda_2$ | $\lambda_3$ | $\lambda_4$ |
| $R_2$ | $\lambda_2$ | $\lambda_3$ | $\lambda_4$ | $\lambda_1$ |
| $R_3$ | $\lambda_3$ | $\lambda_4$ | $\lambda_1$ | $\lambda_2$ |
| $R_4$ | $\lambda_4$ | $\lambda_1$ | $\lambda_2$ | $\lambda_3$ |

For example, each receiver can receive at any given time a data carrier signal on any of the four carrier wavelengths $\lambda_1$ to $\lambda_4$.

FIG. 2 shows diagrammatically the architecture of the switch 100. For simplicity, the values M=N=32 are chosen by way of example.

The switch 100 includes:

a broadcaster stage 20 for broadcasting 32×4 groups of signals, each group comprising eight signals with different, spectrally-multiplexed wavelengths, this stage including optical signal coupling means 21 to 24, each having eight inputs connected to a separate set of eight contiguous input ports of the set of input ports $(PE_j)_{1 \leq i \leq N}$ and 32 outputs, the coupling means 21 to 24 therefore each being adapted to broadcast a group of eight spectrally-multiplexed signals to each output port;

a first selector stage 30 including 32 sets of four SOA-based optical ports 301 to 332, one optical port of each set being open when the generator is operating, for example, to select 32 of the broadcast groups, some of which can be similar;

a separator stage 40 including 32 AWG cyclic wavelength division demultiplexers 401 to 432 each with eight inputs and eight outputs, to separate the eight signals of each of the selected 32 groups; and a second selector stage 50 including 32 sets 501 to 532 of eight SOA-based optical gates, one optical gate of each set being open when the generator is operating, for example, to select 32 output signals from the separated signals.

Each of the 32 output signals is directed to a separate output port $(PS_i)_{1 \leq i \leq M}$ via an optical coupling stage 60 including 32 couplers 601 to 632 each having eight inputs and one output.

A SOA-based at least partially broadcasting switch of the above kind is fast, producing a tuning time of the order of 10 ns.

For example, the wavelengths $\lambda_1$, $\lambda_2$ and $\lambda_{32}$ are chosen at any given time for four separate output ports. These choices are represented in FIG. 2, starting from the broadcasting of the groups for the wavelengths $\lambda_1$, $\lambda_2$ and the selection of broadcast groups for the wavelength $\lambda_{32}$.

FIG. 3 shows diagrammatically the architecture of a data transmission system 2 including a second embodiment of a data carrier signal generator G2 of the invention.

The generator G2 supplies 32 series of signals each comprising four separate data carrier signals with identical carrier wavelengths.

Four AWG cyclic wavelength division demultiplexers 201 to 204 each having 32 inputs and outputs each receive 32 signals of the 32 series and separate them, directing them to a separate output connected to a receiver $(R_i)_{1 \leq i \leq M}$ to which the data is addressed. Thus the $i^{th}$ modulator $Mod_i$ is connected to the $i^{th}$ receiver $R_i$ as follows:

the first modulator $Mod_1$ is connected via the first demultiplexer 201 to the first receiver $R_1$;

the second modulator $Mod_2$ is connected via the second demultiplexer 202 to the second receiver $R_2$;

the third modulator $Mod_3$ is connected via the third demultiplexer 203 to the third receiver $R_3$;

the fourth modulator $Mod_4$ is connected via the fourth demultiplexer 204 to the fourth receiver $R_4$;

the fifth modulator $Mod_5$ is connected via the first demultiplexer 201 to the fifth receiver $R_5$, and so on.

The transmission system 2 has a transmission capacity of 40×32 Gbit/s, i.e. 1.28 Tbit/s.

The generator G2 includes laser sources $(E_i)_{1 \leq i \leq 32}$ with different constant carrier wavelengths $(\lambda_i)_{1 \leq i \leq 32}$. The corresponding carrier frequencies $(f_i)_{1 \leq i \leq 32}$ are decreasing and regularly distributed over a frequency comb with a step equal to 100 GHz, for example. The generator includes a broadcasting optical switch 1000, each input port $(PE_i)_{1 \leq i \leq 32}$ of which is connected to a laser source $(E_i)_{1 \leq i \leq 32}$ with the same number and whose 32 output ports $(PS_i)_{1 \leq i \leq 32}$ are connected to 32 optical signal dividers 301 to 332 each having one input and four outputs.

The output ports of the switch feed 32 sets of four optoelectronic modulators $(Mod_i)_{1 \leq i \leq 128}$, for example 10 Gbit/s lithium niobate Mach-Zehnder modulators, connected to the four AWG wavelength division demultiplexers 201 to 204.

The operation of the switch 1000 is identical to that described with reference to FIG. 2.

FIG. 4 shows diagrammatically the architecture of a data transmission system 3 including a third embodiment of a data carrier signal generator G3 of the invention.

The generator G3 supplies 256 data carrier signals which, after amplification in 32 sets 701 to 732 of 32 optical amplifiers, are injected into 32 cyclic AWG wavelength division demultiplexers 201 to 232 each having 32 inputs and 32 outputs, to separate the injected signals. The optical data carrier signals are then sent to the receivers $(R_i)_{1 \leq i \leq 256}$ to which the data is addressed.

The transmission system 3 has a transmission capacity of 10×256 Gbit/s, i.e. 2.56 Tbit/s.

The generator G3 includes eight generators $(Ge_i)_{1 \leq i \leq 8}$ of a first type similar to that described with reference to FIG. 1, with M=N=32. Thus laser sources $(E_i)_{1 \leq i \leq 256}$ with 32 different constant carrier wavelengths $(\lambda_i)_{1 \leq i \leq 32}$ and corresponding carrier frequencies $(f_i)_{1 \leq i \leq 32}$ regularly distributed over a frequency comb with a step equal to 100 GHz, for example, are associated in series of 32 with a separate broadcasting optical switch 101 to 132. Each broadcasting optical switch 101 to 132 has input ports $(PE_i)_{1 \leq i \leq 32}$ and output ports $(PS_i)_{1 \leq i \leq 32}$ connected to optoelectronic modulators $(Mod_i)_{1 \leq i \leq 256}$, for example 10 Gbit/s lithium niobate Mach-Zehnder modulators.

The generator G3 also includes optical switches 601 to 632 each having eight inputs connected to a separate modulator of each first type generator $(Ge_i)_{1 \leq i \leq 8}$ and eight outputs connected to eight amplifiers belonging to different sets.

FIG. 5 shows diagrammatically the architecture of a generator G4 of data carrier signals in a fourth embodiment of the invention including a partially broadcasting switch restricted to two destinations, by way of example. Such a generator can be used for emitting signals into two optical fibers. Broadcasting to two destinations then suffices since it is not possible to use the same wavelength more than once in each fiber.

The generator G4 includes laser sources numbered $L_1$ to $L_{N/2}$ each of constant carrier wavelength $\lambda_i$ where $1 \leq i \leq N/2$. The generator G4 further includes a partially broadcasting optical switch 102 in which each input port is connected to the same-number laser source and each output port is connected to a same-number optoelectronic modulator $(Mod_i)_{1 \leq i \leq M}$, e.g. of the 10 Gbit/s lithium niobate Mach-Zehnder type. The switch 102 can broadcast an optical signal from any input port to any two output ports, in order to reduce the number of carrier wavelengths needed.

The switch 102 comprises:

N/2 broadcasters $C_1, C_2, \ldots, C_{N/2}$ each having one input respectively constituting an input port of the switch 102, and two outputs; and a non-broadcasting space division switch 500 having N inputs respectively connected to the outputs of the broadcasters $C_1, C_2, \ldots, C_{N/2}$, and M outputs, these outputs constituting the output ports of the switch 102; this switch 500 comprising:

a first stage constituted by N non-broadcasting space division switches $A_1, A_2, \ldots, A_N$ each having an input constituting a respective input of the switch 500, and M outputs; and a second stage constituted by M space division switches $B_1, \ldots, B_M$, each having N inputs, each input being connected to a respective output of one of the switches $A_1, A_2, \ldots A_N$; and having a single output constituting a respective output of the switch 500.

Associating two-output broadcasters $C_1, C_2, \ldots C_{N/2}$ with the non-broadcasting space division switch 500 provides a switch 102 that is partially broadcasting, having broadcasting limited to two destinations. By way of example, consider producing two modulated signals of wavelength $\lambda_1$ respectively on the outputs of modulators $Mod_i$ and $Mod_M$. A carrier of wavelength $\lambda_1$ is continuously supplied by the laser source $L_1$. The broadcaster $C_1$ splits this carrier into two carriers of wavelength $\lambda_1$ that are applied respectively to the two switches $A_1$ and $A_2$, with this being done independently of the other carriers of wavelengths $\lambda_2, \ldots \lambda_{N/2}$. By way of example, the switch $A_1$ is controlled to transmit a carrier to the switch $B_1$ so as to reach the modulator $Mod_1$, while the switch $A_2$ is controlled to transmit the other carrier to the switch $B_M$ so as to reach the modulator $Mod_M$.

Of course, the invention is not limited to the embodiments that have just been described. For example, a plurality of laser sources could be replaced by a single laser emitting simultaneously on a plurality of wavelengths, followed by a demultiplexer.

In particular, other technologies can be used for the optical gates, the switches and the amplifiers.

Finally, any means can be replaced by equivalent means without departing from the scope of the invention.

What is claimed is:

1. A generator for generating at least M data carrier optical signals having selectable carrier wavelengths, where M is an integer greater than 1, said generator comprising N laser sources with constant and different wavelengths, where N is an integer greater than 1, and an optoelectronic modulator adapted to form one of said M optical data carrier signals,
    wherein said generator comprises:
    M−1 other optoelectronic modulators each adapted to form one of M−1 other optical data carrier signals, and
    an at least partially broadcasting optical switch having N input ports coupled to the N laser sources and only having M output ports coupled to the M modulators, the optical switch being adapted to send a plurality of modulators the same signal selected from the signals supplied by the laser sources, to form a plurality of signals, and
    wherein the at least partially broadcasting optical switch comprises:
    a broadcasting stage supplying K groups of signals from N signals supplied by the N laser sources, each group comprising M identical signals each constituted by a spectrum multiplex of N/K signals of distinct carrier wavelengths, where K is an integer factor of N: and
    spectrum-switched selector means.

2. A generator according to claim 1 for generating at least M optical signals, the generator being characterized in that the at least partially broadcasting switch (102) includes a broadcasting stage ($C1, \ldots, C_{N/2}$) for broadcasting to a plurality of destinations each signal provided by the laser sources, independently of the other signals, followed by a selection stage including a non-broadcast space-division switch (500).

3. A generator (G1) according to claim 1 for generating at least M optical signals, the generator being characterized in that the spectrum-switched selector means (30, 40, 50) of the at least partially broadcasting optical switch (100) include:
    a first selector stage (30) adapted to select M of the M×K broadcast groups,
    a separator stage (40) adapted to separate the N/K signals of each of the M selected groups, and
    a second selector stage (50) adapted to receive the separated signals and to select said M output signals.

4. A generator (G1) according to claim 3 for generating at least M optical signals, the generator being characterized in that the first selector stage (30) includes M sets (301 to 332) of K optical gates, one optical gate from each set being open while the generator is operating, and the second selector stage (50) includes M sets (501 to 532) of N/K optical gates, one optical gate from each set being open when the generator is operating.

5. A generator (G1) according to claim 3 for generating at least M optical signals, the generator being characterized in that the separator stage (40) includes M arrayed waveguide grating cyclic wavelength division demultiplexers (401 to 432).

6. A generator (G2) according to claim 1 for generating at least M optical signals, the generator being characterized in that it includes (P−1)×M, where P is an integer greater than 1, other optoelectronic modulators ($Mod_i$) connected in sets of P modulators to a separate output port ($PS_i$) of the optical switch (100, 1000, 101 to 132) and adapted to form M×P optical data carrier signals with selectable carrier wavelengths.

7. A generator (G3) for generating at least M data carrier signals with selectable carrier wavelengths, incorporating an integer number C greater than 1 of generators according to claim 1 for generating at least M signals, the generator being characterized in that it includes M optical switches (601 to 632) each having C inputs and C outputs, connected to a separate modulator ($Mod_i$) of each of said generators.

8. A generator (G1, G2, G3, $Ge_i$) according to claim 1 for generating at least M optical signals, the generator being characterized in that each modulator ($Mod_i$) is chosen from the group comprising lithium niobate Mach-Zehnder modulators, electro-absorption modulators, and all-optical converters.

9. A data transmission system (1, 2, 3) incorporating a generator (G1, G2, G3, $Ge_i$) according to claim 1.

10. A data transmission system (1, 2, 3) according to claim 9, characterized in that it includes at least one AWG wavelength division demultiplexer (200, 201 to 232) adapted to separate the signals from said generator (G1, G2, G3).

* * * * *